Sept. 21, 1965  H. HÜGEL  3,207,239
APPARATUS FOR MARKING AND FOR RECOVERING
ORIENTED DRILL CORES
Filed Oct. 31, 1961  2 Sheets-Sheet 1

INVENTOR
HELMUT HÜGEL
BY
ATTORNEY.

Sept. 21, 1965   H. HÜGEL   3,207,239
APPARATUS FOR MARKING AND FOR RECOVERING
ORIENTED DRILL CORES
Filed Oct. 31, 1961   2 Sheets-Sheet 2

INVENTOR
HELMUT HÜGEL
BY
ATTORNEY.

3,207,239
APPARATUS FOR MARKING AND FOR RECOVERING ORIENTED DRILL CORES
Helmut Hügel, Salvador-Bahia, Brazil, assignor to Tiefbohr-Mess-Dienst Leutert & Hugel G.m.b.H., Luneberg-Erbstorf, Germany, a corporation of Germany
Filed Oct. 31, 1961, Ser. No. 148,897
4 Claims. (Cl. 175—44)

The present invention relates to an apparatus for marking and for recovering oriented drill cores.

For the removal of oriented cores in deep drilling it is required that, preferably, one or a plurality of marks are formed on the cylindrical core surface, which marks are disposed parallel to the core axis, the azimuth of which is marked on a diagram or film relative to a predetermined direction, for instance, the magnetic north direction, in an orienting device disposed above a core protecting tube, the latter and the orienting device not joining the rotation during the drilling.

The marking knives have the additional function to retain the core-tube during the core drilling on the core which is still connected with the ground, which core-tube does not join the rotation and which is suspended from a bearing at its upper end in the core drill, such retaining being achieved in such manner that the inner tube with the marking knives slides downwardly while not being rotated and receiving the core. The marking knives cause then vertical cuts on the core surface.

In the known designs of core drills, which serve this purpose, catching-wedges or catching-flaps are applied, which, upon completion of the core cutting operation are supposed to be urged towards the core during the lifting of the core drill in order to tear off the latter and to prevent its sliding out from the core drill. A drawback of the known methods resides in the fact that the catching-wedges or catching-flaps while in their holding position are contacted during the core drilling by cuttings, rubbed off the core material and by drilling mud, and may thereby be jammed so that at the moment of lifting of the core drill upon completion of the drilling—and thus at a time period when the core is torn off and is to be caught—the catching-wedges or catching-flaps are no longer sufficiently pressed towards the core, so that a sliding out and a part or total loss of the core can occur. A further drawback of the known methods resides in the fact that the marking knives, which are supposed to prevent simultaneously the rotation of the inner tube, penetrate for such a short length downwardly over the core surface for each rotation of the core bit that, particularly at the start of the coring operation, their engagement at the periphery of the core is insufficient to overcome the friction in the bearing of the suspended inner assembly of the core drill with the core tube and the orienting device which are supposed to remain stationary. The core is then reduced by the marking knives to a diameter corresponding to that of their inner edges, whereby simultaneously the sharp inner edges of the marking knives are blunted or eroded and then later, when the core is disposed at a higher level in the core tube, have insufficient engagement to retain the core tube in a non-rotating position. Attempts have been made to overcome this drawback, by providing a guide plug, which was secured to the lower part of the inner tube by means of a shearing pin. The marking knives in the inner tube are fitted into guide grooves in the guide plug, which is equipped at its bottom side with radially disposed vertical cutting edges or pins, the latter being secured at the start of the coring on the bottom of the drilling hole. If, however, the shearing pin between the guide plug and the inner tube, which remains stationary, shears off, the friction between the radially disposed holding elements of the guide plug, namely the radially disposed vertical cutting edges or pins, and the top end of the core is no longer sufficient, to prevent the rotation of the plug, and, thereby, also of the inner tube with the outer tube, due to the bearing friction, since the guide plug engages now the head end of the drill core by its own weight only.

It is one object of the present invention to provide an apparatus for marking and for recovering oriented drill cores which avoids the mentioned draw-backs of the known designs.

It is another object of the present invention to provide an apparatus for marking and for recovering oriented drill cores which includes means for preventing the joint rotation of the inner tube with the outer tube from the start.

It is still another object of the present invention to provide an apparatus for marking and for recovering oriented drill cores which includes means for retaining the marking knives in catching engagement with the core, in such manner, that the inner tube remains always non-rotatable relative to the core.

It is yet another object of the present invention to provide an apparatus for marking and for recovering oriented drill cores which includes means for assuring a safe recovery of the core upon completion of the coring without additional catching devices for the core, such as catching-wedges or catching-flaps.

It is still a further object of the present invention to provide an apparatus for marking and for recovering oriented drill cores by arranging movable marking knives, which are radially pushed inwardly at their upper end by means of springs, the upper inner points of the marking knives catching the core during the upward pulling of the core drill. The prevention of rotation of the stationary inner tube relative to the core is assured by the marking knives, which are spring-biased inwardly at their top even during the core drilling. Thus, when the core has already partly penetrated into the inner tube, the initial securing of the inner tube to the bottom of the bore hole at the start of the core drilling is brought about, according to one method, by means of a guide plug with grooves, into which the marking knives penetrate by strong spring pressure, so that by means of friction between the marking knives and the one-part guide plug, the relative lifting of the latter in the core tube is prevented after shearing off the safety pin. In accordance with another method a two-part guide plug is provided, the upper part of which is at first connected with the holder of the marking knives by one or a plurality of shearing pins. The lower part thereof, having grooves formed therein into which the marking knives penetrate by strong spring pressure, is strongly urged downwardly onto the bottom of the bore hole and then onto the top end of the core by means of an elastic hydraulic brake, whereby, as it is conventional, the non-rotary connection between the core and the lower part of the guide plug is assured, on the one hand, by means of radial, vertical holding elements disposed at the bottom of the lower part, and an axial parallel non-rotatable guide between the upper and lower part of the guide plug, on the other hand. At the start of the core drilling process, the elastic, uniformly operating hydraulic brake, mounted between the upper and the lower parts of the guide plug, is compressed by the core penetrating into the inner tube up to an abutment. The brake path, and, thereby the path of the lower part of the guide plug up to the abutment on its upper part is measured in such a manner, that the top end of the core has penetrated, at the moment of engaging the abutment, nearly up to the upper ends of the marking knives. If now, upon further penetration of the core, the shearing pin or pins are sheared off—which pins have secured at first the upper part of the guide plug on the holder of the marking knives—the inwardly spring-biased marking knives have already obtained a rotation-free hold on the top end of the core, to assure proper orientation of the drill core, so long as the core itself offers sufficient resistance against rotation, which resistance has been found from practical experiences to occur in most instances in deep drilling even in soft rock material, due to the hydraulic pressure exerted thereon. Since the marking knives, movable radially at their upper ends and spring-biased inwardly, are disposed with their upper inner point along a circle which is small relative to the bored core, their engagement with the core itself is assured even if the bored core does not have the full diameter for any reason, for instance due to an eccentric run of the core bit, so that even under such unfavorable conditions, a core orientation may be brought about. The safe recovery of the core is obtained in such manner, that the upper pointed ends, which can be formed as particularly resistant against wear by providing hard metal or diamonds, penetrate easily into the cuts in the core formed by the marking knives, and tear off the core upon pulling upwardly the core drill after terminating the coring, due to the spring pressure exerted thereon.

With these and other objects in view, which will become apparent in the following detailed description, the present invention will be clearly understood in connection with the accompanying drawings, in which.

Figure 1:
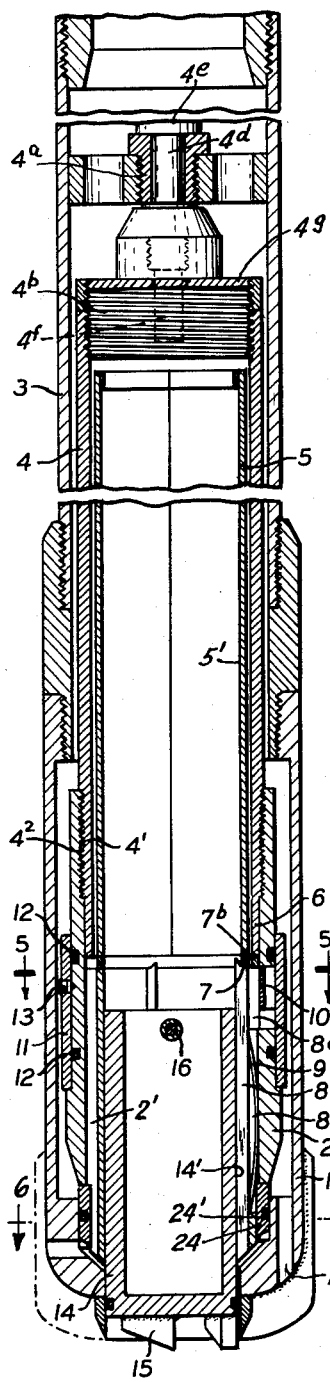
FIGURE 1 is an axial section of the lower end of the core drill, disclosing a one-part guide plug.

Referring now to the drawings, and in particular to FIG. 1, the apparatus, designed in accordance with the present invention, comprises a core bit 1, a marking knife holder 2, and an outer power transmitting core drill tube 3.

Figure 3:
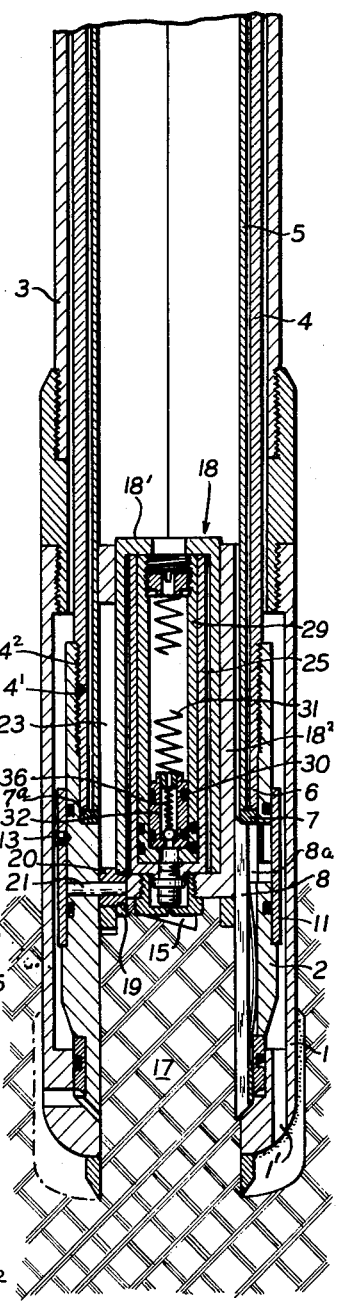
FIG. 3 is a section taken as indicated by the lines 3—3 of FIG 2a, and showing the core drilling apparatus of the invention in the position thereof after the commencement of the core drilling operation.
Figure 4:
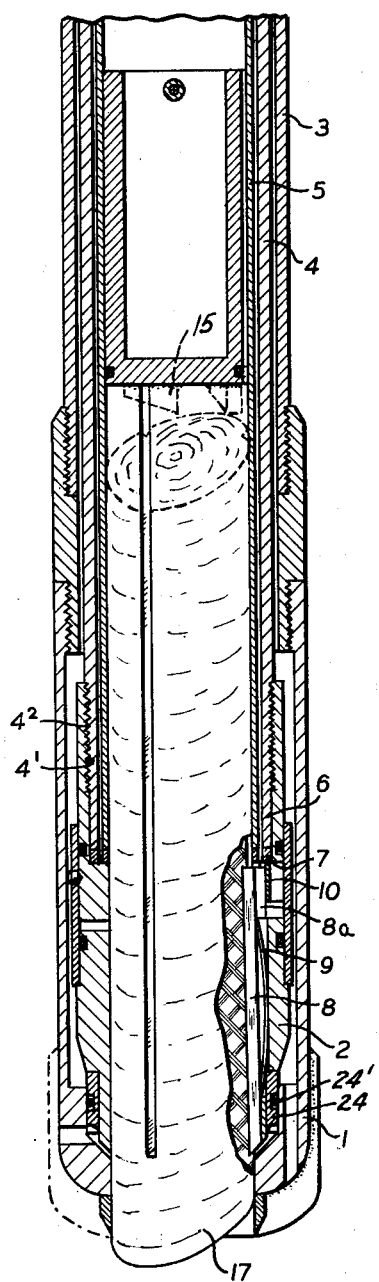
FIG. 4 is an axial section of the core drill, similar to that of FIG. 1, however, the guide plug being now in lifted position relative to the inner tube, and the marking knives pushed into the core by the springs, thus in core recovering position.
Figure 2A:
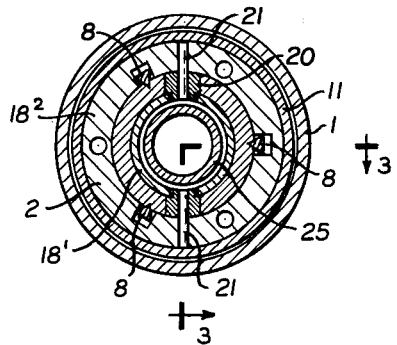
FIG. 2a is a section along the lines 2a—2a of FIG. 2.

An inner protecting tube 4, including a hollow, generally cylindrical end plug 4b screw threadably attached thereto and an extension 4c and stub shaft 4d projecting as shown from the end plug 4b, is supported within the core drill tube 3 by the positioning of the stub shaft 4d within a bearing assembly 4a of the core drill tube 3. To this effect, the stub shaft 4d includes an enlarged head portion 4e which cooperates as shown with the bearing assembly 4a to support the weight of the inner protecting tube 4 within the core drill tube 3. An orienting device is indicated at 4f and is positioned as shown with the end plug 4c. It is to be noted that the orienting device indicated at 4f may take the form of any of the well known constructions thereof, as for example, those disclosed in United States Patents Nos. 2,205,022, 2,489,566, and 2,628,816, and in an article, "Oil Field Developments," at page 716 of Petroleum Production Engineering, 3rd edition, McGraw-Hill Book Company, Inc., New York-London, 1946. The end plug 4b comprises an end wall 4g which extends thereacross and includes a bore formed therein for the extension of the orienting device 4f therethrough, in fluid-tight relationship therewith, so that the upper end of the inner protecting tube 4 is sealed relative to the interior of the core drill tube 3. The bearing 4a is mounted in the core drill tube 3, and a preferably longitudinally slotted two-part core tube 5 is disposed in the protecting tube 4, which is equipped with extensions 6 at its lower end. The lower end of the protecting tube 4 has an outer thread 4' and the upper end of the marking knife holder 2 has an inner thread $4^2$ complementary to the outer thread 4', whereby upon screwing together the protecting tube 4 with the marking knife holder 2, the longitudinally slotted abutment ring 7—each half of which is point welded as shown to a corresponding half of the longitudinally slotted core tube 5—is pressed against the bottom end face of the extension 6. The halves of the abutment ring 7 function simultaneously, as shown, as abutments for the upper end faces of the marking knives 8. A projection 7a on the lower side of one half of the abutment ring 7, fits as shown in FIG. 3 into a groove in the marking knife holder 2, in order to prevent rotation of the core tube 5 relative to the marking knife holder 2 and protecting tube 4, respectively.

Axially extending bores 7b are formed in the abutment ring 7, in the manner depicted in FIG. 1, and function to place the axially extending space 5', formed between the exterior wall of the core tube 5 and the interior wall of the protecting tube 4, in fluid-flow communication with the axially extending bores 2' in the marking knife holders 2. The marking knives 8 have on their top radial, outwardly extending projections 8a, which are received in corresponding slots of the marking knife holder 2 and serve the purpose to provide a parallel guide for the upper ends of the marking knives during their radial movement. The marking knives 8 are, preferably, of triangular cross-section and are fitted into corresponding dove-tailed slots provided in the marking knife holders 2 at their lower ends only in such manner that these slots leave free the inner knife-shaped, triangular edge. These slots are not disposed exactly parallel to the longitudinal axis, rather they are inclined at a very small angle upwardly towards the longitudinal axis, in such manner that the upper ends of the marking knives 8 extend radially inwardly, when the marking knives 8 are received in the slots. This inward extension of the marking knives 8 is supported by means of strong spring blades 9 which are received in slots 8' disposed in the center portion of the marking knives, the slots 8' being disposed parallel to the longitudinal axis and are arranged behind the previously mentioned slots and which spring blades 9 have a short operating stroke, so that in this manner by the combination of the self-resiliency of the marking knives 8 with the force of the spring blades 9, disposed behind the marking knives 8, the latter rest solidly with their inner edge in the guide grooves of a guide plug 14, whereby an appreciable frictional resistance prevents a relative rising of the guide plug 14.

Figure 5:
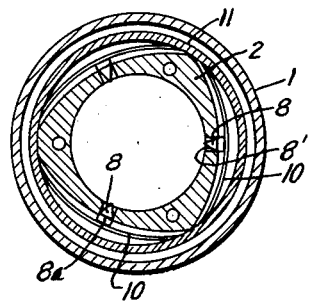
FIG. 5 is a cross-section along the line 5—5 of FIG. 1 of the upper portion of the holder of the marking knives, at enlarged scale.
Figure 6:
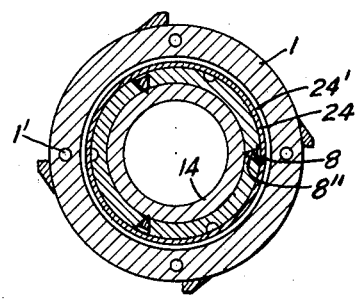
FIG. 6 is a cross section along the lines 6—6 of FIG. 1.

The upper ends of the marking knives 8 may be additionally urged radially inwardly by tangentially disposed springs 10, which permit a greater operating stroke, which, however, is limited by the abutment of the spring on the outer face of the marking knife holders 2 (FIG. 5). A spring holding ring 11 retains the tangentially disposed springs 10 in operative position. Annular O-rings 12 provide a sealing between the spring holding ring 11 and the marking knife holder 2, so that no liquid can penetrate from the annular space, defined by the outer core tube 3 and the protecting tube 4, into the inner core tube 5. A closing member namely the plug 4b seals off the top of the protecting tube 4 to prevent entrance of fluid therein.

A set screw 13 is received in the spring holding ring 11 and engages the outer surface of the marking knife holder 2, in order to prevent any axial movement of the spring holding ring 11 relative to the marking knife holder 2.

The marking knife holder 2 is equipped on its lower end with a wear ring 24 and an O-ring 24' positioned therearound as shown. The said O-ring $24^2$ seals the annular space between the core bit 1 and the marking knife holder 2 to prevent the highly pressurized drilling fluid within the axially extending space 1" above the fluid discharge nozzles 1' from flowing into contact with the core, while at the same time enabling free rotation between the said core bit 1 and the said marking knife holder 2.

The one-part guide plug 14 is equipped on its outer face with grooves 14' disposed parallel to the longitudinal axis, and the marking knives 8 penetrate and are resiliently urged into the grooves 14'. The guide plug 14 is further provided at its lower end with radially disposed vertical cutting edges or pins 15 which are pressed into the bottom of the drill hole at the start of the drilling process. Shearing pins 16, inserted crosswise into the guide stopper or plug 14, secure the latter to the marking knife holder 2 until the shearing pins 16 are sheared off by the penetrating core 17.

Figure 2:
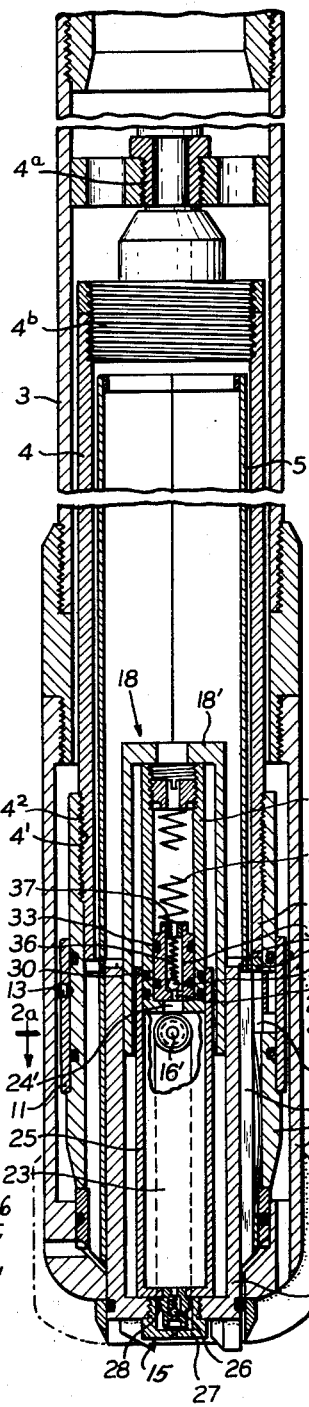
FIG. 2 is an axial section of the lower end of the core drill, disclosing a two-part guide plug and showing the lower part of the latter in its lower starting position.

Referring now again to the drawings, and in particular to FIG. 2, the upper part of a two-part guide plug 18 is connected by shearing pins 16' with the marking knife holder 2, in the same manner as it was shown in FIG. 1 in connection with the one-part guide plug 14. Projections 19 extend from the lower end of the two-part guide plug 18 (FIG. 3), and radial guide bushings 20 extend outwardly from the projections 19 to the inner face of the marking knife holder 2, which guide bushings 20 receive shearing pins 21. The lower part $18^2$ of the two-part guide plug 18 can slide upwardly in axial direction, between the upper part 18' of the guide plug 18 and the marking knife holder 2, the outer diameter of the upper part 18' being appreciably smaller than the inner diameter of the marking knife holder 2. For this purpose, guide slots 23 are provided over the greater portion of the entire length of the lower part $18^2$ of the two-part guide plug 18 to receive the guide bushings 20 therein. In similar manner, as provided in the one-part guide plug 14, the lower part $18^2$ of the two-part guide plug 18 is equipped with guide grooves for the marking knives 8 and carries at its bottom radially disposed holding members 15. The upper ends of the marking knives 8 are equipped with projections 8a.

An elastic, hydraulic brake is disposed between the upper part 18' and the lower part $18^2$ of the two-part guide plug 18 and comprises a brake cylinder 25 having a filling valve 26 at its bottom, the filling valve 26 being protected by the protecting cover 27 and the protecting plug 28. A brake-piston 29 receprocates in and is sealed against the brake cylinder 25 by means of annular O-rings 30. Furthermore, the brake piston 29 has at its lower end a bore 24' and carries inside an equalizing piston 32 retained in its lowermost position by means of a spring 31 and is sealed against the brake piston 29 by means of annular O-rings 33 and carries further, at its center, a pressure regulating valve 35, a valve ball 34, a valve spring 36 and a control screw 37, which elements serve the purpose to maintain a desired, predetermined liquid pressure in the brake cylinder 25. The latter is filled with liquid through the filling valve 26 by means of a suitable pump prior to the insertion of the core drill 1. The brake-piston 29 pushes, thereby, the lower part $18^2$ of the two-part guide plug 18 downwardly to a point until an abutment is reached. The shearing pins 21 are then inserted and a spring holding ring 11 is moved downwardly and secured by the set screw 13 against the marking knife holder 2.

Upon assembly of the core drill down at the bottom of the drill hole, the radial holding elements 15, secured to the bottom of the lower part $18^2$ of the guide plug 18, are passed rigidly to the ground with such a force, that at the start of the core drilling, the protection tube 4 remains connected over the marking knife holder 2, the marking knives 8 and the grooves in the guide plug 18 with the bottom of the bore hole. The top of the core 17 penetrates now during the continued drilling operation into the marking knife holder 2, whereby the lower part $18^2$ of the guide plug 18 is moved upwardly. The liquid contained in the brake cylinder 25 is put under pressure and moves in turn the equalization piston 32 upwardly overcoming the pressure of the spring 31, until the valve spring 36 permits opening of the valve ball 34 upon reaching a predetermined pressure and liquid can pass through.

If pressure changes occur upon the lower part $18^2$ of the guide plug 18 during the drilling operation, the guide plug 18 is pressed elastically to the top of the core 17 by the excessive pressure maintained in the brake cylinder 25 by the spring 31 and the equalizing piston 32, so that the holding elements 15 never lose their engagement with the top of the core 17. Upon further penetration of the core 17 into the marking knife holder 2, the lower part $18^2$ of the guide plug 18 is finally pushed upwardly to such an extent by the continued liquid displacement from the brake cylinder 25, until the braking piston 29 has displaced all liquid and engages the bottom of the brake cylinder 25 (FIG. 3). Simultaneously, also the lower end of the parallel guide slots 23 in the lower part $18^2$ of the guide plug 18 engages the guide bushings 20 and, upon further advancement of the drilling core 17, the shearing pins 21 are sheared off. The entire plug 18 is then moved upwardly as a single unit by the penetrating core 17. The marking knives 8 have at this point, however, a sufficient length of rotation-free guidance on the core itself, so that there is no more danger that the protecting tube 4, with the core tube 5, and the marking knife holder 2 joins the rotation.

From the arrangement in the drawings and from the description of the present invention as set forth above, it is clearly apparent that the non-rotation of the protecting tube 4 with the core tube 5, which is rather essential for the core orientation, is assured by the cooperation of the one-part guide plug 14 in combination with the marking knives 8, spring-biased inwardly at their top, or with the two-part guide plug 18, the lower part $18^2$ of which is pressed to the top of the core 17 by the hydraulic elastic brake for such a time period until the knives 8 find sufficient guide on the core 17 itself. Without providing the guide plug 18, the knives could be damaged at the start of the coring and could break off later under certain circumstances, if they are not protected at that particular period by the guide plug. On the other hand, the guide plug 18 serves its purpose only in view of the presence of the non-rotating inner tube with the marking knives, which simultaneously also serve as a locking against rotation.

While I have disclosed several embodiments of the present invention, it is to be understood, that these embodiments are given by example only and not in a limiting sense, the scope of the present invention being determined by the claims.

I claim:

1. In a core-drilling apparatus for marking of oriented drilling cores functioning simultaneously as core recovering means,
   a core drilling tube,
   a core bit,
   means connecting said core bit with said core drilling tube for joint rotation,
   a non-rotating protecting tube disposed in said core drill tube,
   an orienting device connected with and disposed above said protecting tube,
   a bearing mounted in said core drilling tube,
   said protecting tube being suspended on said bearing,
   a marking knife holder connected with and extending downwardly from said non-rotating protecting tube,
   said marking knife holder having a plurality of axially disposed slots peripherally spaced apart from each other and opening into the inside of said marking knife holder, a marking knife received in each of said slots and having an upper end, spring means urging the upper ends of said marking knives radially inward, a guide plug having axially disposed grooves at its outer surface and receiving said marking knives in said grooves, said guide plug being non-rotatably mounted in said marking knife holder, a radially disposed shearing pin connecting said guide plug with said marking knife holder, said guide plug carrying at is lower end vertically downwardly directed, radially disposed vertical cutting edges, the latter pressing at first into the bottom of the drilling hole and later into the top of said drilling core, in order to prevent rotation of said non-rotating protecting tube, the non-rotation of the latter being maintained after shearing-off said shearing pin by said core during its penetration into said marking knife holder, said marking knives forming cuts in said core as the latter penetrates into said marking knife holder, said upper ends of said marking knives being adapted to penetrate and be forced into said cuts in said core to retain the said core in the said core drilling apparatus during the raising of the latter at the completion of the core drilling operation and, said radially inward spring-biased marking knives preventing an easy rising of said guide plug in said marking knife holder due to friction between said marking knives and said guide plug, so that a rigid engagement is retained between said radial cutting blades of said guide plug and said core, as long as said guide plug moves axially still within the range of said marking knives.

2. The apparatus, as set forth in claim 1, wherein said guide plug comprises an upper part and a lower part, said parts being telescopically movable into each other, said lower part having axially extending guide grooves formed therein into which said marking knives project, said upper part of said guide plug being retained against rotation in said marking knife holder by means of said shearing pin, said lower part of said guide plug being retained against rotation in said marking knife holder by said vertical grooves provided on the outer surface of said lower part and receiving said marking knives, and said lower part having at its lower end said cutting blades, a cylinder disposed in said lower part and receiving a hollow brake-piston reciprocating therein, said cylinder being filled with liquid, a spring-biased equalizing piston reciprocating in said hollow brake-piston and having a spring-biased valve at one end thereof, said end being open and communicating with an opening in the bottom of said lower part, thereby pressing said lower part toward the bottom of said drilling hole and toward the top of said core upon starting the coring operation, whereby said protecting tube being forcibly engaged with the upper end of said core and being prevented from rotation during the starting period of said coring operation, until said lower part of said guide plug has penetrated into said marking knife holder, due to escape of said liquid from said cylinder through said spring-biased valve, to an extent that said marking knives have received a sufficient hold on said core, to prevent rotation of said protecting tube and said shearing pin to be sheared-off upon further penetration of said core.

3. The apparatus, as set forth in claim 1, wherein said spring means inserted in said marking knife holder comprises axially disposed spring blades received in said axial slots of said marking knife holder, and tangentially disposed spring blades engaging the rear face of said marking knives, the upper ends of said marking knives being urged radially inward by said spring means to an extent that upon cutting said core with a diameter smaller than the inner diameter of said marking knife holder, said core is still marked by said marking knives and retains said protecting tube in non-rotating position due to the connection of said protection tube with said marking knife holder.

4. The apparatus, as set forth in claim 1, wherein said upper ends of said marking knives include upwardly extending, pointed portions formed thereon for penetration into said core.

References Cited by the Examiner
UNITED STATES PATENTS

| | | | |
|---|---|---|---|
| 1,542,172 | 6/25 | Reed et al. | 175—245 |
| 1,773,915 | 8/30 | Lydon | 175—44 |
| 1,845,230 | 2/32 | Brown | 175—245 |
| 2,238,609 | 4/41 | Sewell | 175—245 |
| 2,489,566 | 11/49 | Engle | 175—44 |
| 2,633,336 | 3/53 | Stokes | 175—245 |
| 2,862,691 | 12/58 | Cochran | 175—245 |

CHARLES E. O'CONNELL, *Primary Examiner.*

BENJAMIN HERSH, *Examiner.*